United States Patent Office 2,731,445
Patented Jan. 17, 1956

2,731,445
POLYURETHANES FROM PIPERAZINES

Emerson L. Wittbecker, West Chester, Pa., assignor to E. I. du Pont de Nemours and Company, Wilmington, Del., a corporation of Delaware No Drawing. Application March 30, 1953,
Serial No. 345,727

12 Claims. (Cl. 260—47)

This invention relates to the preparation of new compositions of matter comprising high molecular weight, high melting polymers suitable for preparation of orientable films and fibers and in particular, relates to piperazine polyurethanes having melting points in excess of 200° C. prepared from dihydroxy aromatic hydrocarbons.

Polyurethanes have been explored very systematically in Germany over the past several years as candidate polymers for the preparation of synthetic films and fibers. As a result, small scale production facilities are in use for the production of "Perlon U," a high molecular weight polyurethane from 1,4 butanediol and hexamethylenediisocyanate having the recurring unit

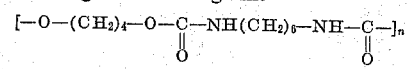

The polyurethanes are structurally allied to the polyamides, the recurring link being NHCOO in place of NHCO. Filamentary products such as yarn and bristles are stiffer than the polyamides and in general possess a lower water absorption. In the fiber field "Perlon U" is inferior to commercial nylon in respect to much lower softening point, more difficult drawing characteristics, lower tenacity and elongation, harsher feel, and inferior dye receptivity. The melting point of 175–180° C. is considered too low for safe ironing.

It is an object of this invention to prepare high melting polyurethanes suitable for the production of flexible films and filamentary products. It is a further object to provide polyurethane fibers suitable for use in the apparel field and having softening points which are adequately high for safe ironing. Other objects will become apparent from the description of the invention which follows and the appended claims.

The objects of this invention are accomplished by preparing high molecular weight fiber-forming polyurethane condensation products of a piperanzine and a dihydroxy aromatic hydrocarbon of 6 to 16 carbon atoms wherein the shortest chain of carbon atoms connecting the two hydroxy radicals includes at least three carbon atoms of one ring. These piperazine polyurethanes may be designated as polyesters of 4,1-piperazinedicarboxylic acid. The methylpiperazines, such as 2,5-; 2,6-dimethylpiperazine and 2,2,5,5-; 2,3,5,6-tetramethylpiperazine may be used instead of piperazine and are intended to be included whenever the latter is mentioned.

Several methods are available for preparing the piperazine polyurethanes of this invention. One general method involves condensation of the aromatic alcohol with N,N'-dicarbophenoxypiperazine at elevated temperatures with the elimination of phenol. This method is illustrated by the following equation, wherein HOArOH represents a dihydroxy-aromatic hydrocarbon:

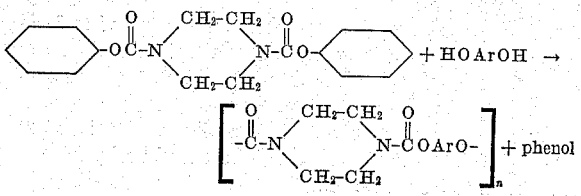

A second method involves mixing an aqueous emulsion system containing in separate phases piperazine and the bis-chloroformate of dihydric alcohol. The condensation may be carried out at relatively low temperatures, in the neighborhood of room temperature, and preferably is conducted in the presence of an HCl acceptor. This reaction may be illustrated as follows:

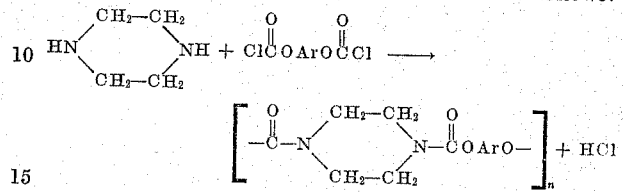

The bis-chloroformates of dihydric alcohols are prepared by reacting one mol of the dihydroxy compound with more than 2 mols of phosgene. With aliphatic glycols, this reaction goes readily to completion and the crude product can be used directly in the reaction with piperazine to form polyurethanes, although it is preferred to distill the bis-chloroformate if the boiling point is reasonably low. The dihydric phenols, however, do not react as readily with phosgene and the crude product generally contains a small percentage of monochloroformate. The high boiling points of the bis-chloroformates of dihydric phenols render the purification of the crude products difficult. For this reason the first condensation polymerization process described may be more adaptable than the second method for the preparation of certain piperazine polyurethanes from dihydric phenols.

A third method, particularly applicable to preparing piperazine polyurethanes from dihydroxy aromatic hydrocarbons involves the condensation of 1,4-piperazinedicarbonyl chloride with the aromatic alcohol in an aqueous emulsion system in the presence of an HCl acceptor. This method is illustrated by the following equation:

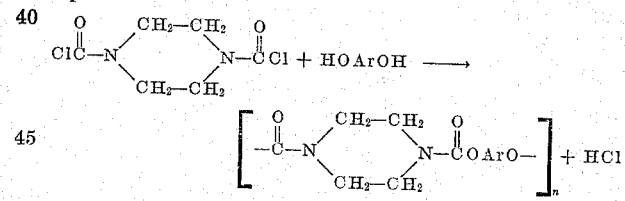

The above methods also apply to the preparation of polyurethanes from methylpiperazines, e. g., 2,5-; 2,6-dimethylpiperazine; 2,2,5,5- and 2,3,5,6-tetramethylpiperazine. Without regard to which method of preparation is employed, the polyurethanes of this invention are high molecular weight fiber-forming polymers which have melting points in excess of 200° C., which can be cold-drawn into highly oriented shaped articles, and are composed of recurring structural units of the general formula,

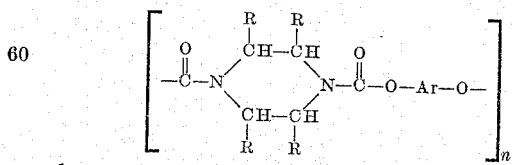

where $n$ is a large whole number, the —O—Ar—O— group is the residue of a dihydroxy aromatic hydrocarbon of 6 to 16 carbon atoms wherein the shortest chain of carbon atoms connecting the two hydroxy radicals includes at least three carbon atoms of one ring, and R is selected from the group consisting of hydrogen and methyl radicals.

The following examples illustrate various methods of preparing the new polymers of this invention and the effect of variations in operating conditions on the products obtained, but are not to be construed as limiting the scope of the invention. In these examples the inherent viscosity values of the product are given as an indication of the degree of polymerization obtained. In view of the relative ease with which these values are determined, they provide a useful method of evaluating the effect of process variables on a given type of polymerization. The values may be misleading when used to compare different types of polyurethanes, but, in general those having values of at least about 0.2 were suitable for spinning. In determining these values, viscosimeter flow times were obtained at 25.0°±0.1° C. for a solvent for the polyurethane and for a solution of the polyurethane in the solvent at a concentration of 0.5 gram per 100 cubic centimeters of solution. The inherent viscosity value was then calculated as 2 times the natural logarithm of the relative viscosity of the solution compared to that of the pure solvent. Unless otherwise stated, the solvent used in determining the inherent viscosities in the following examples was meta-cresol. The melting point is taken as the lowest temperature at which a fresh polymer sample leaves a wet molten trail as it is stroked with moderate pressure across a clean heated metal surface, such as a brass block. Bulk polymer is supported manually or with tweezers, and powder or the like is manipulated with a spatula.

Example 1

Polyurethane from N,N'-dicarbophenoxypiperazine and diphenylolpropane. N,N'-dicarbophenoxypiperazine was prepared in the following manner: Into a 3-neck flask equipped with two dropping funnels and a stirrer was placed 38.8 grams (0.2 mol) of piperazine hexahydrate and 50 cc. of water. Solutions of 19.2 grams (0.48 mol) of sodium hydroxide in 90 cc. of water and 75 grams (0.48 mol) of phenylchloroformate in 50 cc. of ether were added simultaneously (the sodium hydroxide solution being kept in slight excess). The reaction temperature was kept below 10° C. and the white solid which separated was removed by filtration and air dried. The product weighing 68.3 grams (theoretical yield is 65.2 grams) melted at 168 to 178° C. Fifty-eight grams of the product was recrystallized from 200 cc. of benzene and 700 cc. of ethanol after concentration to about 500 cc. There was obtained 48.2 grams of a product melting at 178 to 180° C. Upon analysis, this product was found to contain 8.66% nitrogen. The theoretical amount of nitrogen in N,N'-dicarbophenoxypiperazine is 8.58%.

The N,N'-dicarbophenoxypiperazine was placed in a polymerization tube with a slight excess of 2,2-di(para-hydroxyphenyl) propane, more commonly referred to as diphenylolpropane, and 0.28% by weight of lithium phenolate. The polymerization tube and its contents were heated for 6 minutes at 218° C. at atmospheric pressure and then at 259° C. for one hour. The pressure was then reduced to 3 mm. of mercury and the heating at 259° C. continued for 1.3 hours. The polyurethane obtained was very viscous and light-colored. After cooling, a brittle solid was obtained having an inherent viscosity of 0.24. The polyurethane could be melted at about 230° C. and melt pressed into thin self-supporting films.

Example 2

Polyurethane from N,N'-dicarbophenoxypiperazine and hydroquinone. N,N'-dicarbophenoxypiperazine, prepared as described in Example 1, was reacted with a slight excess of hydroquinone in the presence of 0.10% by weight of lithium phenolate in a polymerization tube. The tube and its contents were heated at atmospheric pressure at 259° C. for 8 minutes, during which phenol distilled and the reaction mass began to solidify. The temperature was raised to 295° C. for 13 minutes, but solidification continued. The pressure was then reduced to 2 mm. of mercury and heating at 295° C. continued for 4 hours. A friable plug was obtained, insoluble in dimethylformamide and soluble in a mixture of 100 parts of phenol and 66 parts of tetrachloroethane. The polyphenylene 1,4-piperazine dicarboxylate was heated at 375° C. without decomposition or melting and had an inherent viscosity of 0.63 in concentrated sulfuric acid.

Example 3

Polyurethane from piperazine and p-phenylene-bis-chloroformate. To an ice-jacketed Waring Blendor was added 100 cc. of water, 7.5 of a 10% aqueous "Duponol" ME (a commercial grade of sodium lauryl sulphate detergent made by E. I. du Pont de Nemours and Company), 17.65 cc. of an aqueous solution containing 0.25 mol of piperazine and 10.38 cc. of water containing 0.05 mol of sodium hydroxide. The reaction vessel was kept under an atmosphere of nitrogen. To the stirring solution was added 0.025 mol of p-phenylene-bis-chloroformate dissolved in 100 cc. of benzene. The precipitated polymer was filtered off, washed thoroughly with water and dried. An 85% yield of polyphenylene 1,4-piperazinedicarboxylate was obtained, having an inherent viscosity of 0.99 measured in a mixed solvent comprising 66 parts by weight of tetrachloroethane and 100 parts by weight of phenol. The polymer did not melt or decompose up to 320° C.

Example 4

Polyurethane from piperazine-1,4-dicarbonyl chloride and diphenylolpropane. Piperazine-1,4-dicarbonyl chloride was prepared by adding a solution of 25.8 g. of anhydrous piperazine and 61 g. of triethylamine in 100 ml. of chloroform to a solution of 75 g. of phosgene in 450 g. of toluene. The melting point of this bis carbamyl chloride was 153–156° C. and its chlorine analysis was 33.15%. (Calcd. for $C_6H_8N_2O_2Cl_2$; Cl=33.13%.)

Diphenylolpropane (11.4 g.) was dissolved in a solution of 4 g. of NaOH in 175 ml. of water. To this aqueous phase was added, with stirring, a solution of 10.55 g. of piperazine-1,4-dicarbonyl chloride in 125 ml. of toluene. The temperature was regulated between 5–10° C. The polyurethane was isolated, washed and dried. The inherent viscosity in m-cresol was 0.41. It softened at 230° C. and was molten at 245° C. and could be melt spun into useful fibers.

Example 5

Polyurethane from 1,4-bis(carbophenoxy) piperazine and 4,4'-dihydroxydiphenyl. A mixture of 7.45 g. of 4,4'-dihydroxydiphenyl and 13.04 g. of 1,4-bis(carbophenoxy) piperazine containing 0.03 g. of lithium phenoxide was heated at 295° C. Phenol distilled from the polymerization and in a few minutes the polymer solidified. After heating for 20 minutes at atmospheric pressure, a vacuum of 2–3 mm. Hg was applied and heating was continued for 3½ hours. The resulting poly-4,4'-diphenylene 1,4-piperazinedicarboxylate did not melt up to 400° C. The inherent viscosity in concentrated sulfuric acid was 0.57.

Example 6

Polyurethane from 1,4-bis(carbophenoxy) piperazine and 1,4-dihydroxynaphthalene. A mixture containing 6.46 g. of 1,4-dihydroxynaphthalene, 13.04 g. of 1,4-bis(carbophenoxy) piperazine and 0.03 g. lithium phenoxide was heated at 259° C. at atmospheric pressure until it started to solidify. The temperature was raised to 295° C. and heating was continued for 15 minutes. Then a vacuum of 2–3 mm. Hg was applied, and heating was continued for four hours. The resulting poly-1,4-naphthylene 1,4-piperazinedicarboxylate did not melt when heated at 375° C. and it had an inherent viscosity of 0.60 in concentrated sulfuric acid.

Example 7

Preparation of the bis-chloroformate of diphenylolpropane. The bis-chloroformate of diphenylolpropane was prepared by adding a solution of 0.5 mol of diphenylolpropane dissolved in 1.0 mol of pyridine and 100 cc. of benzene to an excess of phosgene. The benzene solution was filtered and any excess phosgene removed. The benzene solution of the bis-chloroformate of diphenylolpropane was used as prepared.

Example 8

Preparation of the polyurethane from piperazine and the bis-chloroformate of diphenylolpropane. To a Waring Blendor jar at room temperature was added 100 cc. of water, 10.6 g. (0.10 mol) of sodium carbonate, 50 cc. (0.05 mol) of piperazine solution, 1.0 g. of "Duponol" ME, and 25 cc. of benzene. To the stirred emulsion was added 40 cc. of a benzene solution containing 0.05 mol of the bis-chloroformate of diphenylolpropane. Acetone was added to break up the emulsion. The polymer was washed and dried. The polymer had an inherent viscosity of 0.46 (m-cresol) and started to rub off on a hot bar at 224° C., although it was not molten until 246° C. This polymer was dry spun from methanol-chloroform azeotrope to give a strong elastic fiber.

The new polymers of this invention are derived from piperazine or a methylpiperazine and a dihydroxy aromatic hydrocarbon of 6 to 16 carbon atoms in which the shortest chain of carbon atoms connecting the two hydroxy radicals includes at least 3 carbon atoms of one ring. Illustrative of these aromatic alcohols are the following: hydroquinone, resorcinol, p,p'-diphenylolmethane, p,p'-diphenylolpropane, p,p'-dihydroxydiphenyl, 3,3'-dihydroxydiphenyl, 2,4'-dihydroxydiphenyl, 2,4- and 2,5- and 2,6-dihydroxytoluenes, 4,4'-dihydroxydibenzyl, 2,4'-dihydroxydiphenyl methane, 4,4'-dihydroxy-2,2'-dimethyldiphenyl, alpha,alpha-bis-(4-hydroxyphenyl) propane, 1,5-dihydroxynaphthalene, 2,6-dihydroxynaphthalene and 1,4-dihydroxynaphthalene. Certain addtional compounds, not classifiable as dihydroxy aromatic hydrocarbons but included within the broader class of dihydric phenols of 6 to 16 carbon atoms devoid of reactive radicals other than the two phenolic —OH radicals and in which the shortest chain of atoms connecting the two —OH radicals includes at least 3 carbon atoms of one ring, are also entirely suitable for the purposes of this invention. These include 4,4'-dihydroxydiphenyl ether, 3,3'-dihydroxydiphenyl sulfone, 4,4'-dihydroxydiphenyl sulfone and N-butyl-4,4'-dihydroxydiphenylamine.

The piperazine polyurethanes and methylpiperazine polyurethanes of this invention possess melting points in excess of 200° C., a property not characteristic of the great majority of polyurethanes and generally unknown to prior art polyurethanes from aliphatic diamines. The importance of this property is well recognized in the synthetic textile trade. Many of the completely synthetic polymeric fibers which show great promise of improved physical characteristics over natural fibers are limited to blends with natural fibers in the textile arts, particularly in the apparel field, because of softening temperatures too low to allow safe ironing. As previously mentioned, this deficiency is particularly true of "Perlon U," the most promising of the polyurethanes chosen for development by the Germans.

As many different embodiments of the present invention may be made without departing from the spirit and scope thereof, it is to be understood that the invention is not limited to the specific embodiments disclosed except to the extent defined in the appended claims.

What is claimed is:
1. A high melting piperazine polyurethane which is a 1,4-piperazinedicarboxylate polyester of a dihydroxy aromatic hydrocarbon of 6 to 16 carbon atoms wherein the shortest chain of carbon atoms connecting the two hydroxy radicals includes at least three carbon atoms of one ring.

2. A high molecular weight piperazine polyurethane having a melting point in excess of 200° C. and composed of recurring structural units of the general formula

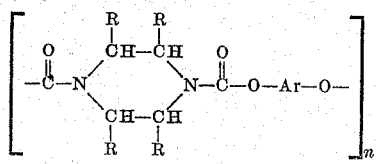

where $n$ is a large whole number, the —O—Ar—O— group is the residue of a dihydroxy aromatic hydrocarbon of 6 to 16 carbon atoms wherein the shortest chain of carbon atoms connecting the two hydroxy radicals includes at least three carbon atoms of one ring, and R is selected from the group consisting of hydrogen and methyl radicals.

3. A fiber-forming piperazine polyurethane, the 1,4-piperazinedicarboxylate polyester of diphenylolpropane, said polyurethane having a melting point in excess of 200° C.

4. A fiber-forming polyphenylene 1,4-piperazinedicarboxylate having a melting point in excess of 200° C.

5. A fiber-forming poly-4,4'-diphenylene 1,4-piperazinedicarboxylate having a melting point in excess of 200° C.

6. A fiber-forming poly-1,4-naphthylene 1,4-piperazinedicarboxylate having a melting point in excess of 200° C.

7. Fibers of a piperazine polyurethane having a melting point in excess of 200° C. and composed of recurring structural units of the general formula

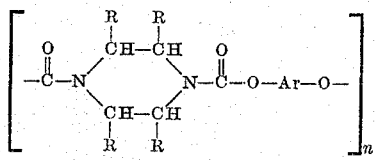

where $n$ is a large whole number, the —O—Ar—O— group is the residue of a dihydroxy aromatic hydrocarbon of 6 to 16 carbon atoms wherein the shortest chain of carbon atoms connecting the two hydroxy radicals includes at least three carbon atoms of one ring, and R is selected from the group consisting of hydrogen and methyl radicals.

8. Fibers of a piperazine polyurethane, the 1,4-piperazinedicarboxylate polyester of diphenylolpropane.

9. Films of a piperazine polyurethane, the 1,4-piperazinedicarboxylate polyester of diphenylolpropane.

10. Fibers of polyphenylene 1,4-piperazinedicarboxylate.

11. Fibers of poly-4,4'-diphenylene piperazinedicarboxylate.

12. Fibers of poly-1,4-naphthylene piperazinedicarboxylate.

References Cited in the file of this patent

UNITED STATES PATENTS

| | | |
|---|---|---|
| 2,284,637 | Catlin | June 2, 1942 |

FOREIGN PATENTS

| | | |
|---|---|---|
| 880,537 | France | Jan. 4, 1943 |
| 892,361 | France | Jan. 7, 1944 |
| 894,763 | France | Mar. 20, 1944 |